Aug. 30, 1932. E. T. CONDON 1,874,027
COMBINED DRIVING MIRROR, PARKING AND SIGNAL DEVICE
Filed Feb. 21, 1930 2 Sheets-Sheet 1

INVENTOR
Edward T. Condon
BY
ATTORNEY

Aug. 30, 1932.  E. T. CONDON  1,874,027
COMBINED DRIVING MIRROR, PARKING AND SIGNAL DEVICE
Filed Feb. 21, 1930   2 Sheets-Sheet 2

INVENTOR
*Edward T. Condon*
BY
ATTORNEY

Patented Aug. 30, 1932

1,874,027

UNITED STATES PATENT OFFICE

EDWARD T. CONDON, OF NEW YORK, N. Y., ASSIGNOR TO AUTOPOSTS COMPANY INC., OF NEW YORK, N. Y., A CORPORATION OF NEW YORK

COMBINED DRIVING MIRROR, PARKING AND SIGNAL DEVICE

Application filed February 21, 1930. Serial No. 430,163.

The invention relates to automobile accessories, more especially to a driving mirror of the type which is intended to be mounted upon a fender or mudguard of a car; and it has for its object to so construct the mirror that there may be combined therewith suitable signalling means under the control of the driver and effective to give indication, not only to the vehicle following the one driven but also to an approaching vehicle, of the operator's intention, more particularly with respect to making a turn. The novel device provides, also, a parking and driving light and affords a very useful accessory for automobiles, combining the feature of rearward vision with notice of intention to both a following vehicle and an approaching one, as well as providing for a parking and driving light.

In carrying out the invention, an elongated mirror is mounted upon the right-hand forward fender of an automobile or, preferably, two such mirrors are employed—one on each of the respective forward fenders. The mirror, of course, is to be mounted thereon in position to face the driver; and from a portion thereof the mirrored surface is removed or an opening cut therein so that a suitable light may be displayed therethrough, the same being under the control of the operator of the automobile. Over the opposite face of the mirror casing, for example at the top and bottom, portions are provided with suitable crystals or lenses adapted for illumination from the interior of said casing, these crystals being of appropriate color and the lighting thereof being also under the control of the automobile operator.

The one of the pair of lamps of a device, furthermore, is designed to be disposed opposite to the opening in the mirror so that when the particular light intended for an indication through said mirror opening is flashed on, the said lens will also be illuminated as at the opposite or lower portion of the device. The other crystal is designed to be illuminated only for parking or driving purposes and is independently controlled.

The nature of the invention, however, will best be understood when described in connection with the accompanying drawings, in which:

Fig. 5 is an exploded view of the device with the stepped contours on the outer faces of the lenses omitted for greater clearness.

Figure 1:
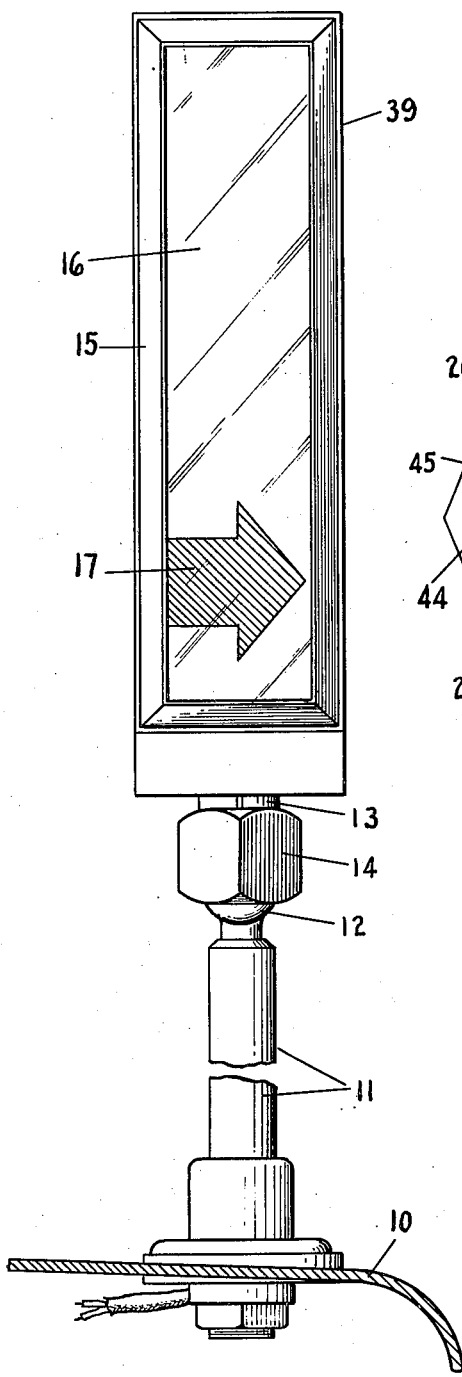
Fig. 1 is a front elevation of the novel device and shown mounted upon the fender of an automobile.
Figure 4:
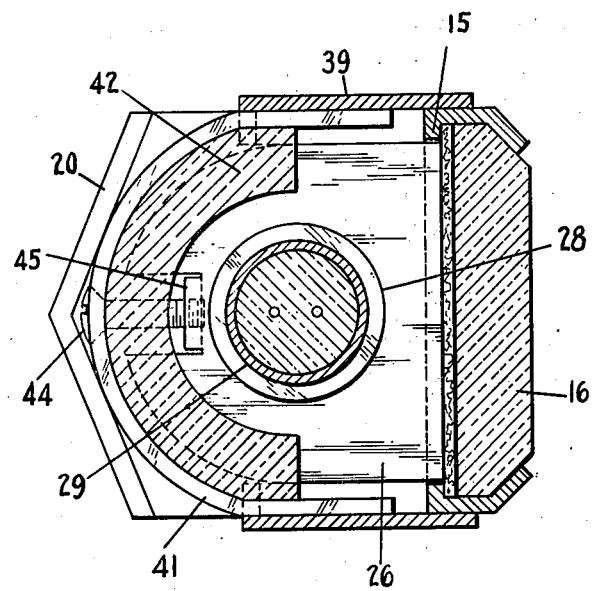
Fig. 4 is a transverse section, on an enlarged scale, and taken on the line 4—4, Fig. 3, looking in the direction of the arrows.
Figure 2:
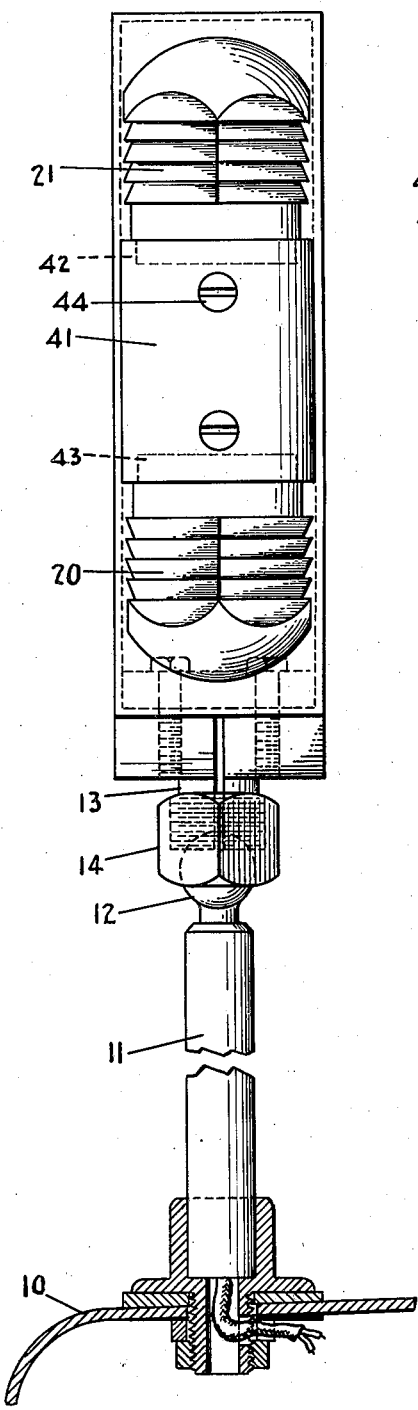
Fig. 2 is a rear view thereof and shows also the manner of attaching the same to a post and the latter to the fender of an automobile.
Figure 3:
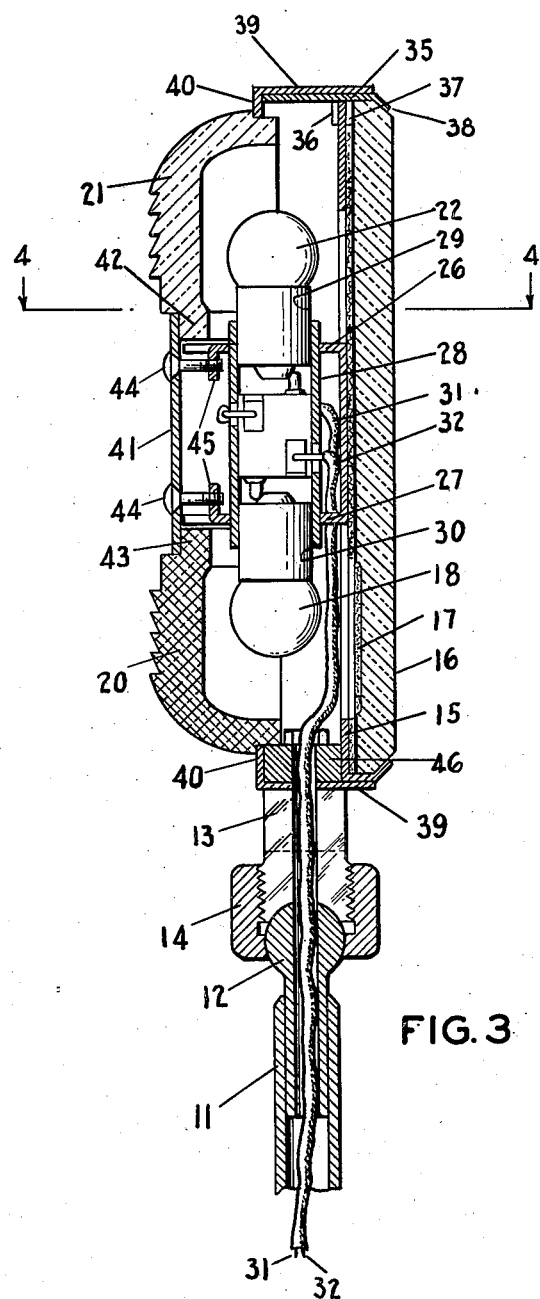
Fig. 3 is a vertical section through the device.

Referring to the drawings, 10 designates a portion of a fender of an automobile and to the top and, preferably near the outer edge of which, so as to avoid obstruction of vision occasioned by the usual spare tire mounting, is secured in any suitable manner a hollow post 11 terminating at the top in a hollow spherical head 12. About the latter is secured a sleeve 13 extending from a block supporting the novel device hereinafter described, the lower end of said sleeve being spherically shaped and threaded to receive a clamping nut 14, and the whole affording a universal joint for rigidly securing the said device to the post at the desired angle.

The said combined driving mirror, parking and signal device comprises a casing or housing secured to the sleeve 13 and embodying a front plate 15 having an elongated opening designed to be closed by a mirrored panel 16 suitably retained therein. This panel, for example at its lower portion, is cut away or, preferably, merely the silvered portion is removed therefrom to outline some desired configuration, as an arrow 17. This particular portion 17 of the plate may be colored with the desired color, for example red; or, the configuration may be etched and colored. In either case, therefore, if a source of illumination, as the electric lamp 18, be provided behind the same, or a lamp of the desired color illuminated behind the configuration when clear glass is utilized, the said arrow will be prominently displayed and will give indication in the desired color to vehicles following the one bearing the device that a turn is intended in the direction in which the arrow points.

At the same time, a view of conditions to the rearward of the driven vehicle will be had by the operator in viewing the mirrored portion of the panel, so that the said vehicle may be manoeuvered with safety. The mirror, furthermore, being secured on the fender is in a position to afford good vision of the adjacent curbing when it is desired to park the car.

As it is desirable, also, to give indication to approaching vehicles of the intention of the driver to make a turn, the rear of the device at the portion opposite the indicating section 17 is closed by means of a crystal or lens member 20, for example colored green when the device is mounted on the starboard side, and red when the device is mounted on the fender on the port side. Thus, when the operator closes a suitable circuit for the lamp 18, not only will an indication be given to the succeeding vehicles but the flashing on of light as seen at the opposite side through the lens 20 will give notice to an approaching vehicle. If desired, well known means for interrupting at intervals the circuit to the lamp may be included therein and thus enhance the effect of the signal.

Furthermore, provision is made for utilizing the device in case of parking of the car; or, in driving, as a driving light, by providing an additional crystal or lens 21 at the upper and back portion of the casing above the lens 20. A further lamp 22 is to this end correspondingly mounted in said casing behind the additional lens 21 which, in this instance, is preferably of clear or of frosted glass uncolored. When it is desired to park the car, it is necessary, therefore, merely to close a suitable circuit to the lamp 22 and thereby illuminate the lens 21.

The said lenses and lamps for illuminating the same may conveniently be assembled and a suitable housing therefor provided in the following manner. From the plate 15 there is struck and turned inwardly at its central portion two parallel wall members 26 and 27 which are also punched to receive and hold with a friction fit a tubuluar support 28 providing the sockets 29 and 30, respectively of the lamps 22 and 18. These sockets may be of the usual bayonet-joint, single-pole type; and conductors 31 and 32 extend respectively from the lamps through the sleeve 13 into the tubuluar member 11 and from the latter to a suitable control (not shown) and located in proximity to the operator of the car.

In order to retain the mirror 16 in position with respect to the plate 15 of the casing a removable top clip member 35 is secured over the edge of said plate as by means of a series of tabs 36 and 37 struck inwardly therefrom and adapted to hold between them the said plate, while at its forward edge the clip is turned inwardly, as at 38, to contact with the bevelled edge of the mirror 16. This inturned portion corresponds to the turned-in edges of the other three sides of plate 15 and serves therewith to retain the mirror securely in position, yet allowing of ready replacement in case of breakage.

Over the said clip and plate edges is provided a cover member 39 having a friction fit therewith and being provided with a back wall 40. The latter is cut away longitudinally to afford end apertures for receiving the lenses 20 and 21, which shoulder on the said wall.

The intermediate portion of the back wall over the lamp socket-retaining member 28 is also cut away and is adapted to be closed by a sealing and holding plate or strap member 41, substantially semi-cylindrical and whose side edges bear upon inner shoulders 42 and 43 of the respective lenses 21 and 20. The member 41, moreover, extends into the cover member 39, while said member 41 is adapted to be rigidly held to the plate 15 as by means of screws 44 which fit tapped ears 45, the same having been struck inwardly from the corresponding walls 26 and 27 of the said plate. In taking up on these screws, cover member 39 will be drawn inwardly toward the plate 15 until the rear wall 40 contacts with the inner edge of the clip 35 at the top and a stop 46 retained in the bottom of the cover contacts with the plate 15. Thereby a rigid assembly of the various housing elements is afforded; and a housing for the lamps, mirror and lenses is provided in a simple and inexpensive manner, as the plate 15, clip 35 and stop 46, and the strap member 41 may all readily be stamped and formed up into the required shapes.

I claim:

1. A device of the character set forth, comprising a housing, a mirror retained thereby having a transparent portion, a lens, behind said transparent portion of the mirror, an electric lamp located within the housing between said lens and transparent portion and adapted simultaneously to illuminate the lens and to display a suitable configuration through the transparent portion, a further lens associated with said housing in the plane of the first-named lens, and an independently operable lamp for illuminating the same said lamp being located behind the mirror and screened thereby.

2. A device of the character set forth, comprising a housing member open at the front and back, a mirrored panel closing the front of the housing having a transparent portion, a plate retaining the panel to the housing, lenses at the upper and lower portion of the back of the housing, a retaining member extending inwardly from the housing front dividing the housing into a plurality of compartments, sockets retained thereby in juxtaposition to the transparent portion of the panel and the said lenses, and a strap member bearing upon the lenses to hold the same in assembled position, and means to connect the strap member to the housing to hold the elements thereof together.

3. A device of the character set forth, comprising a housing member embodying a plate having inturned wall portions intermediate its ends and provided with an opening, a mirrored panel closing said opening and having a transparent portion registering therewith, the panel being surrounded along all but one of its edges by an inturned flange portion of the said plate, a clip removably retained to the unflanged edge of the plate and having an inturned portion for holding the panel over its remaining unsecured edge to the plate, a cover fitting over the clip and having end openings and an intermediate opening in its back, lenses adapted to fit over the end openings, one being located behind the said transparent portion of the mirror, a strap member bearing upon the lenses to hold the same in assembled position, means to connect the strap member to the inturned wall portions to secure the housing elements together, and a pair of sockets supported by the said inwardly turned wall portions, and located respectively in juxtaposition to the transparent mirror portion and associated lens and to the other of the two lenses.

4. A device of the character set forth, comprising a housing, a mirror retained thereby having a transparent signal portion, a second signal portion in the housing opposite said transparent signal portion, an electric lamp common to both of said signal portions to illuminate the same simultaneously, a third signal portion in the housing, substantially in the plane of said second signal portion and screened by the mirror, and an independently operable lamp for illuminating the same, said lamp being located behind the mirror and screened thereby.

In testimony whereof I affix my signature.

EDWARD T. CONDON.

CERTIFICATE OF CORRECTION.

Patent No. 1,874,027.   August 30, 1932.

EDWARD T. CONDON.

It is hereby certified that error appears in the printed specification of the above numbered patent requiring correction as follows: In the drawings, Sheet 3, containing Fig. 5, as shown herewith, should be inserted as part of the Letters Patent, and in the heading to the drawings, in sheets numbered one and two in the patent, for "2 Sheets" read "3 Sheets";

Aug. 30, 1932.  E. T. CONDON  1,874,027

COMBINED DRIVING MIRROR, PARKING AND SIGNAL DEVICE

Filed Feb. 21, 1930   3 Sheets-Sheet 3

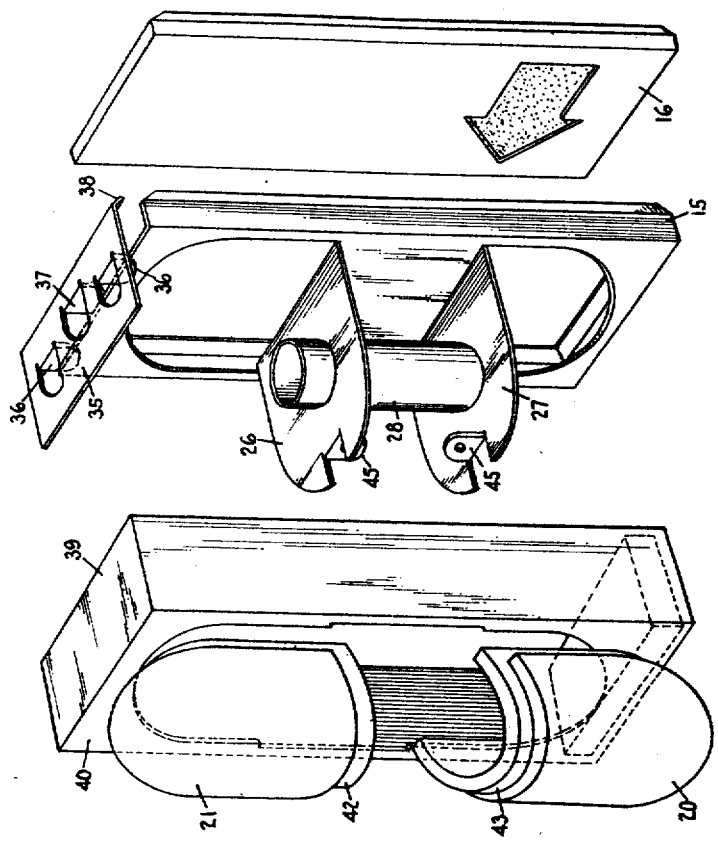

FIG. 5

INVENTOR
Edward T. Condon
BY
ATTORNEY and that the said Letters Patent should be read with these corrections therein that the same may conform to the record of the case in the Patent Office.

Signed and sealed this 9th day of May, A. D. 1933.

M. J. Moore

(Seal)   Acting Commissioner of Patents.